(12) United States Patent
Chang

(10) Patent No.: US 10,997,093 B2
(45) Date of Patent: May 4, 2021

(54) NVME DATA PROCESSING METHOD AND NVME DEVICE

(71) Applicant: Huawei Technologies Co., Ltd., Shenzhen (CN)

(72) Inventor: Sheng Chang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 58 days.

(21) Appl. No.: 16/251,805

(22) Filed: Jan. 18, 2019

(65) Prior Publication Data

US 2019/0155760 A1 May 23, 2019

Related U.S. Application Data

(63) Continuation of application No. PCT/CN2017/092815, filed on Jul. 13, 2017.

(30) Foreign Application Priority Data

Oct. 26, 2016 (CN) .......................... 201610948309.2

(51) Int. Cl.
*G06F 13/16* (2006.01)
*G06F 13/18* (2006.01)
*G06F 3/06* (2006.01)

(52) U.S. Cl.
CPC ........ *G06F 13/1642* (2013.01); *G06F 3/0611* (2013.01); *G06F 3/0659* (2013.01);
(Continued)

(58) Field of Classification Search
CPC ...... G06F 13/1642; G06F 13/16; G06F 13/18; G06F 3/0611; G06F 3/0659; G06F 2213/16
See application file for complete search history.

(56) References Cited

U.S. PATENT DOCUMENTS

2003/0070055 A1* 4/2003 Johnson .............. G06F 13/1642
711/202
2003/0217234 A1* 11/2003 Rowlands ........... G06F 12/0817
711/141
(Continued)

FOREIGN PATENT DOCUMENTS

CN 104111907 A 10/2014
CN 104246742 A 12/2014
(Continued)

OTHER PUBLICATIONS

Foreign Communication From a Counterpart Application, Chinese Application No. 17864689.9, Extended European Search Report dated Jun. 5, 2019, 7 pages.
(Continued)

*Primary Examiner* — William E. Baughman

(57) ABSTRACT

A Non-Volatile Memory Express (NVMe) data reading/writing method and an NVMe device, where in the method, a transceiver receives an NVMe command from a host into a submission queue (SQ), an SQ control circuit sends the NVMe command in the SQ to an solid state drive (SSD) controller when detecting that the SQ in an SQ cache changes, the SSD controller executes the NVMe command, writes a generated NVMe command response into a completion queue (CQ) using a CQ control circuit, and instructs, by triggering an interrupt, the host to read the CQ such that the host processes the NVMe command response in the CQ. Because both the SQ and the CQ are located in the NVMe device, a central processing unit (CPU) can directly read the NVMe command response in the CQ or directly write the NVMe command into the SQ, thereby further reducing consumption of CPU resources.

20 Claims, 13 Drawing Sheets

(52) U.S. Cl.
CPC ............ *G06F 13/16* (2013.01); *G06F 13/18* (2013.01); *G06F 2213/16* (2013.01)

(56) References Cited

U.S. PATENT DOCUMENTS

| | | | | |
|---|---|---|---|---|
| 2013/0198312 | A1* | 8/2013 | Tamir | G06F 13/4282 |
| | | | | 709/212 |
| 2013/0254435 | A1* | 9/2013 | Shapiro | G06F 3/065 |
| | | | | 710/23 |
| 2014/0325013 | A1 | 10/2014 | Tamir et al. | |
| 2014/0331001 | A1 | 11/2014 | Liu et al. | |
| 2015/0006663 | A1 | 1/2015 | Huang | |
| 2015/0261434 | A1 | 9/2015 | Kagan et al. | |
| 2016/0026388 | A1 | 1/2016 | Jeong et al. | |
| 2016/0132237 | A1 | 5/2016 | Jeong et al. | |
| 2016/0147671 | A1 | 5/2016 | Vishne et al. | |
| 2016/0357481 | A1* | 12/2016 | Nam | G06F 3/061 |
| 2017/0300426 | A1 | 10/2017 | Chai et al. | |
| 2017/0322897 | A1* | 11/2017 | Benisty | G06F 13/1621 |
| 2018/0069923 | A1* | 3/2018 | Tsalmon | G06F 15/17331 |

FOREIGN PATENT DOCUMENTS

| | | |
|---|---|---|
| CN | 104536701 A | 4/2015 |
| CN | 104572491 A | 4/2015 |
| CN | 105589661 A | 5/2016 |
| CN | 105892945 A | 8/2016 |
| EP | 3147792 A1 | 3/2017 |

OTHER PUBLICATIONS

Machine Translation and Abstract of Chinese Publication No. CN105892945, dated Aug. 24, 2016, 15 pages.
Foreign Communication From a Counterpart Application, PCT Application No. PCT/CN2017/092815, English Translation of International Search Report dated Oct. 18, 2017, 2 pages.
Machine Translation and Abstract of Chinese Publication No. CN104536701, dated Apr. 22, 2015, 7 pages.
Foreign Communication From a Counterpart Application, Chinese Application No. 201610948309.2, Chinese Office Action dated May 29, 2019, 10 pages.

* cited by examiner

NVME DATA PROCESSING METHOD AND NVME DEVICE

CROSS-REFERENCE TO RELATED APPLICATIONS

This application is a continuation of International Patent Application No. PCT/CN2017/092815 filed on Jul. 13, 2017, which claims priority to Chinese Patent Application No. 201610948309.2 filed on Oct. 26, 2016. The disclosures of the aforementioned applications are hereby incorporated by reference in their entireties.

TECHNICAL FIELD

The present application relates to the field of storage technologies, and in particular, to a Non-Volatile Memory Express (NVMe) data reading/writing method and an NVMe device.

BACKGROUND

The NVMe protocol defines a command set, a queue, and a register interface for interaction between a driver and a non-volatile storage subsystem, for example, a solid state drive (SSD) having a peripheral component interconnect express (PCIe) standard interface. The NVMe protocol also defines a basic command set of a nonvolatile memory (NVM) subsystem. The NVMe protocol is defines an extensible host control interface, and the NVMe protocol is used to meet requirements of enterprise and client systems that use PCIe SSDs.

There are a lot of steps in an existing NVMe command processing procedure. An NVMe command execution procedure starts with a host phase, goes to an NVMe device phase, and then goes back to the host phase. To be specific, an NVMe command processing procedure includes three phases, and a register operation of a doorbell mechanism needs to be performed in a process of protocol transmission from a host to an NVMe device and in a process of protocol transmission from the NVMe device to the host separately. An interrupt operation is also used in an NVMe command execution process. In addition, all caches used in submission of an NVMe command, that is, a completion process, are specified areas in a memory of the host.

Therefore, as can be learned, the three phases and the register and interrupt operations make the NVMe command execution procedure very long, cause a long latency, and occupy a lot of central processing unit (CPU) resources.

SUMMARY

Embodiments of the present application provide an NVMe data reading/writing method and an NVMe device to resolve the following problems. An existing NVMe command execution procedure is long, a latency is long, and excessive CPU resources are occupied.

In view of this, a first aspect of the present application provides an NVMe data reading/writing method. A device performing the method includes an NVMe device. The NVMe device not only includes an SSD controller and a memory but also includes a submission queue (SQ) cache configured to store an SQ and a completion queue (CQ) cache configured to store a CQ. The SQ and the CQ in an NVMe execution procedure are not set in a memory of a host, instead, the SQ is set in the SQ cache, and the CQ is set in the CQ cache. The SSD controller further includes an SQ control module configured to manage the SQ and a CQ control module configured to manage the CQ. In this case, an NVMe command execution procedure may be changed into the following. First, the SSD controller receives an NVMe command written by the host into the SQ in the SQ cache, then the SQ control module detects the SQ cache, and when the SQ in the SQ cache changes, sends the NVMe command in the SQ to the SSD controller, then the SSD controller executes the NVMe command, and writes a generated NVMe command response into the CQ using the CQ control module, and then the SSD controller instructs, by triggering an interrupt, the host to read the CQ such that the host processes the NVMe command response in the CQ, thereby completing operations in an NVMe device phase.

As can be learned, after the foregoing NVMe device architecture is used, the SQ and the CQ are not stored in the memory of the host any longer, but are directly set in the NVMe device. In comparison with an existing NVMe command execution procedure, the NVMe device does not need to read the NVMe command from the memory of the host using direct memory access (DMA) and write the NVMe command response into the memory of the host using DMA. Therefore, a latency is reduced greatly, a bandwidth collision in a memory operation is reduced, and memory usage of a CPU is reduced. In addition, because both the SQ and the CQ are located in the NVMe device, the CPU can directly read the NVMe command response in the CQ or directly write the NVMe command into the SQ, thereby further reducing consumption of CPU resources. In addition, the NVMe device designed in this manner can support Cache Coherent Interconnect for Acceleration (CCIX) in hardware, thereby implementing a unified software memory and heterogeneous computing of input/output (I/O) operations.

In some embodiments, the SQ control module is mainly configured to manage writing and reading of the NVMe command in the SQ cache. To be specific, when the CPU of the host writes the NVMe command into the SQ cache or the SSD controller reads the NVMe command from the SQ cache, the SQ control module needs to be used. Therefore, implementability of the data reading/writing method is improved.

In some embodiments, in addition to managing writing and reading in the SQ cache, the SQ control module can further manage a collision between writing and reading of an NVMe command of a same address, and can preset a priority of writing the NVMe command to be higher than a priority of reading the NVMe command. Because writing is writing by the CPU outside the NVMe device, but reading is reading by the SSD controller in the NVMe device, a writing rate is lower than a reading rate. Therefore, the design can ensure smooth execution of a system.

In some embodiments, the SQ control module may further maintain a position of the NVMe command in the SQ, and instruct the SSD controller to read the NVMe command in the SQ. To be specific, when a change occurs in the SQ, the SQ control module can instruct in time the SSD controller to process the NVMe command in the SQ. Therefore, implementability of the system is improved.

In some embodiments, a capacity of the SQ cache is a quantity of CPU cores of the host multiplied by an NVMe queue depth and then multiplied by 64 bytes. Because an SQ entry (SQE) is 64 bytes, and each CPU core can separately run a thread, the capacity of the SQ cache is set to the foregoing quantity, to ensure that no problem of waiting occurs when all cores work simultaneously.

In some embodiments, the CQ control module is mainly configured to manage writing and reading of the NVMe command response in the CQ cache. To be specific, when the CPU of the host reads the NVMe command response from the CQ cache or the SSD controller writes the NVMe command response into the CQ cache, the CQ control module needs to be used. Therefore, implementability of the data reading/writing method is improved.

In some embodiments, the CQ control module may further maintain a position of the NVMe command response in the CQ, and instruct the SSD controller to write the NVMe command response into the CQ. To be specific, after the NVMe command response is generated, which indicates that a read/write operation is already completed, the CQ control module can instruct in time the SSD controller to process the NVMe command response in the CQ. Therefore, implementability of the system is improved.

In some embodiments, a capacity of the CQ cache is a quantity of CPU cores of the host multiplied by an NVMe queue depth and then multiplied by 16 bytes. Because a CQ entry (CQE) is 16 bytes, and each CPU core can separately run a thread, the capacity of the CQ cache is set to the foregoing quantity to ensure that no problem of waiting occurs when all cores work simultaneously.

In some embodiments, a caching agent (also referred to as CA) module is further disposed in the NVMe device, and the caching agent module is mainly applied to caching, and mainly configured to maintain coherence of a level-three cache of a CPU in the host.

In some embodiments, an actual process of executing the NVMe command by the SSD controller is writing data stored in the NVMe device into the memory of the host. A detailed process may be first, the SSD controller reads the data in the NVMe device according to the NVMe command, and then the caching agent module writes the read data into the memory of the host by performing a remote storage operation, and completes the NVMe command. Therefore, implementability of the reading/writing method can be enhanced.

In some embodiments, a home agent (also referred to as HA) module may be further disposed in the NVMe device, and the home agent module mainly manages a local cache space of the NVMe device, for example, reports a size of the local cache space of the NVMe device to the host such that the host can know usage of the local cache of the NVMe device. In addition, the home agent module mainly processes a read request and a write request in the local cache space. Because the home agent module is disposed, implementability of the reading/writing method can be enhanced.

In some embodiments, the home agent module is further connected to the SQ cache, and in this case, the home agent module may be further configured to receive a read request or a write request in the local cache, and return a response message to a sender of the read request or the write request, thereby processing and scheduling the read request and the write request in the local cache.

A second aspect of the present application further provides an NVMe data reading/writing method. A device performing the method includes an NVMe device. The NVMe device includes an SSD controller and a memory, and may further include an NVMe cache configured to read or write data from or into a level-three cache of a CPU of a host, and a caching agent module configured to manage the NVMe cache. In this case, in an NVMe device phase, an NVMe command execution procedure may be as follows. The caching agent module listens to an SQ located in a memory of the host, where the SQ includes an NVMe command written by the host into the memory, in the listening process, when the caching agent module detects that data in the SQ is updated, the caching agent module reads the NVMe command from the SQ, and stores the NVMe command in the NVMe cache, then the SSD controller fetches the NVMe command from the NVMe cache, executes the NVMe command, and generates an NVMe command response after completing the execution, then the caching agent module writes the NVMe command response into a CQ in the memory by performing a remote storage operation, and finally the SSD controller instructs, by triggering an interrupt, the host to read the CQ from the memory and process the NVMe command response in the CQ.

As can be learned, in comparison with an existing NVMe device that needs to be instructed by a host to passively execute an NVMe command, the NVMe cache and the caching agent module are added. Mainly the caching agent module listens to SQ data. Once the SQ data is updated, it means that an NVMe command is written into the SQ again. In this case, the caching agent module fetches the NVMe command to the NVMe device, then the SSD controller processes the NVMe command, and after completing the processing, stores an NVMe command response in the CQ in the memory using the caching agent module, and the SSD controller instructs, by triggering an interrupt, the host to read and process the NVMe command response in the CQ. It can be learned that, in this way, a manner of executing the NVMe command changes from passive to active. In addition, in comparison with an existing NVMe command execution procedure, a register notification manner of a doorbell mechanism is not required during switching of an execution phase, and therefore consumption of CPU resources can be reduced. In addition, the NVMe device designed in this manner can support CCIX in hardware, thereby implementing a unified software memory and heterogeneous computing of I/O operations.

In some embodiments, the caching agent module listens to the SQ data located in the host, where the SQ data is located in the memory of the host, or may be located in the level-three cache of the CPU of the host, and the SQ corresponding to the SQ data includes the NVMe command written by the host into the memory. The listening manner of the caching agent module may be as follows. The caching agent module sends a listen message to a home agent module in the CPU of the host, and then the home agent module queries and determines, according to the listen message, that the SQ data in an SQ address space changes, then the home agent module queries whether the SQ data is hit in the level-three cache, and if the SQ data is hit, directly fetches the hit SQ data from the level-three cache and returns the hit data to the NVMe cache, and the caching agent module may obtain the NVMe command from the NVMe cache. In this manner, implementability of the reading/writing method can be enhanced.

In some embodiments, if the SQ data is not hit in the level-three cache, the home agent module continues to query the memory of the host, and if determining that data in the memory is updated, the home agent module directly reads the data from the memory and returns the data to the NVMe cache. Likewise, in this manner, implementability of the reading/writing method in the embodiments of the present application can be enhanced.

In some embodiments, that the caching agent module writes the NVMe command response into a CQ in the memory by performing a remote storage operation may be first, the caching agent module initiates a memory write command to the home agent module of the CPU, and then the home agent module writes the NVMe command response into the CQ according to the memory write command. In this manner, implementability of the reading/writing method in the embodiments of the present application can be enhanced.

In some embodiments, in addition to directly writing the NVMe command response into the memory, the caching agent module may further first write the NVMe command response into the level-three cache of the CPU, and then instruct the CPU to write the NVMe command response into the memory. In this manner, the NVMe command response can also be finally written into the memory. In this manner, implementability of the reading/writing method in the embodiments of the present application can be enhanced.

A third aspect of the embodiments of the present application further provides an NVMe device, where the NVMe device includes at least one module configured to perform the NVMe data reading/writing method provided by the first aspect or any embodiment of the first aspect.

A fourth aspect of the embodiments of the present application further provides an NVMe device, where the NVMe device includes at least one module configured to perform the NVMe data reading/writing method provided by the second aspect or any embodiment of the second aspect.

A fifth aspect of the embodiments of the present application provides an NVMe device, where the NVMe device includes a processor, a memory, and a cache. The cache is configured to store an SQ and a CQ, the memory is configured to store an instruction, and the processor is configured to execute the instruction to perform the NVMe data reading/writing method provided by the first aspect or any embodiment of the first aspect.

A sixth aspect of the embodiments of the present application further provides an NVMe device, where the NVMe device includes a processor, a memory, and a cache. The cache is configured to write data into a level-three cache, or read data from a level-three cache, the memory is configured to store an instruction, and the processor is configured to execute the instruction to perform the NVMe data reading/writing method provided by the first aspect or any embodiment of the first aspect of this application and perform the NVMe data reading/writing method provided by the second aspect or any embodiment of the second aspect of this application.

A seventh aspect of the embodiments of the present application provides a storage medium, where the storage medium stores program code, and when an NVMe device runs the program code, the NVMe device performs the NVMe data reading/writing method. The storage medium is an SSD.

An eighth aspect of the embodiments of the present application provides a storage medium, where the storage medium stores program code, and when an NVMe device runs the program code, the NVMe device performs a method for scheduling information provided by the second aspect or any implementation of the second aspect. The storage medium is an SSD.

DESCRIPTION OF EMBODIMENTS

An NVMe data reading/writing method and an NVMe device are provided to resolve the following problems. An existing NVMe command execution procedure is complex, a latency is long, and excessive CPU resources are occupied.

To make persons skilled in the art understand the technical solutions in the present application better, the following clearly describes the technical solutions in the embodiments of the present application with reference to the accompanying drawings in the embodiments of the present application. The described embodiments are merely a part rather than all of the embodiments of the present application. All other embodiments obtained by persons of ordinary skill in the art based on the embodiments of the present application without creative efforts shall fall within the protection scope of the present application.

Detailed descriptions are hereinafter provided separately.

In the specification, claims, and accompanying drawings of the present application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present application described herein can be implemented in other orders than the order illustrated or described herein.

Figure 1:
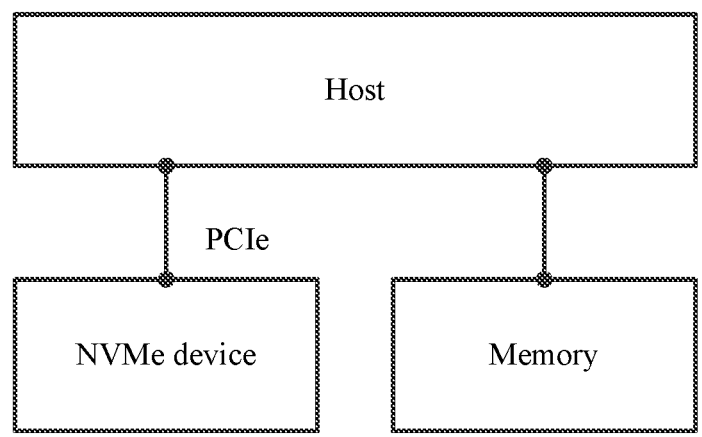
FIG. 1 is a schematic architectural diagram of an NVMe system.
Figure 2:
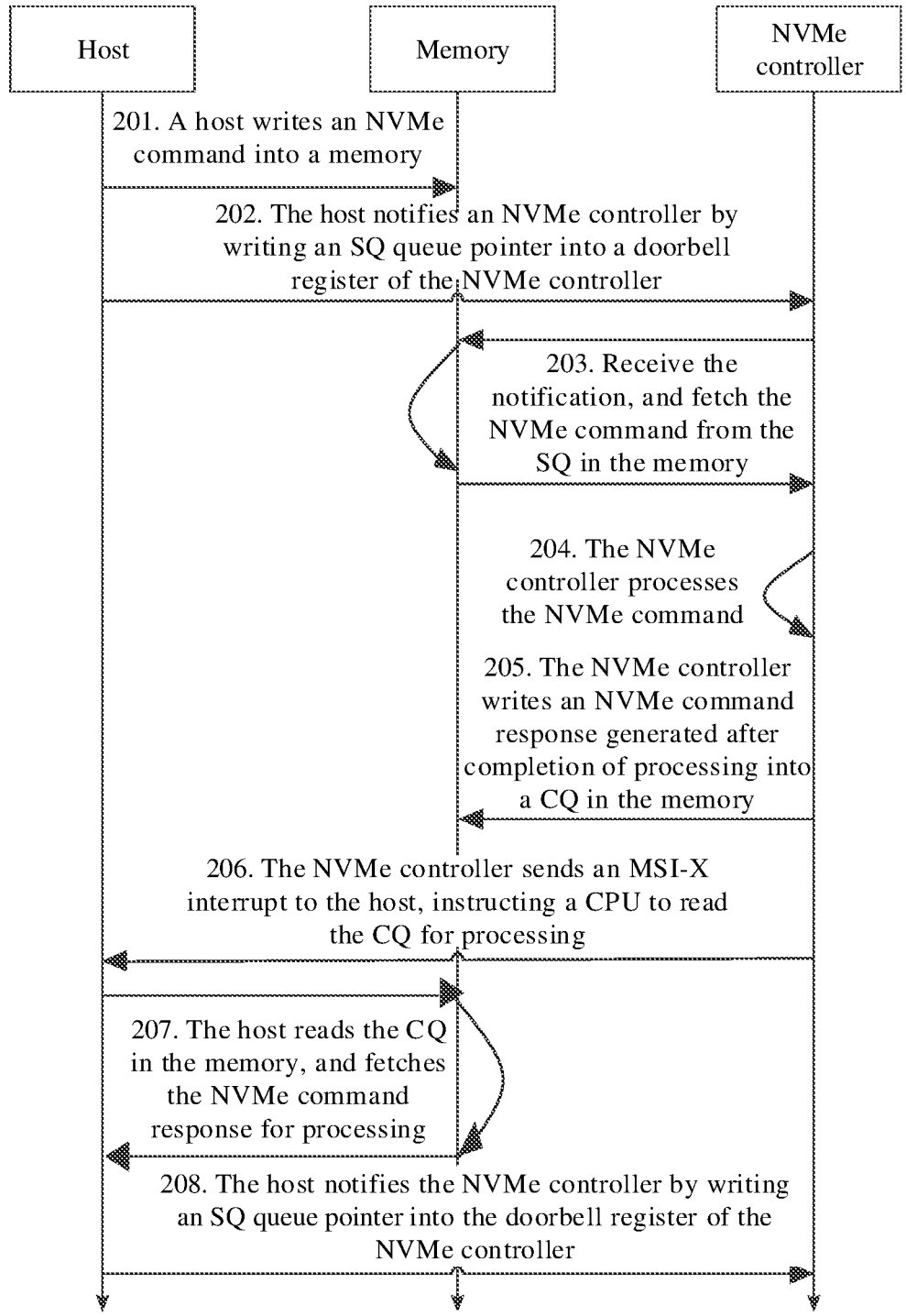
FIG. 2 is a schematic diagram of execution of an NVMe command.

A main architecture to which an NVMe technology application scenario comprises a host and an NVMe device. For details, refer to FIG. 1. FIG. 1 is a schematic architectural diagram of an NVMe system, including a host, a memory of the host, and an NVMe device. The host and the NVMe device are connected using a PCIe bus, and a CQ and an SQ are both located in the memory. For a specific execution process, refer to FIG. 2. FIG. 2 is a schematic diagram of execution of an NVMe command.

The following steps are included.

Step 201. A host writes an NVMe command into a memory.

Step 202. The host notifies an NVMe controller by writing an SQ queue pointer into a doorbell register of the NVMe controller.

Step 203. The NVMe controller receives the notification, and fetches the NVMe command from an SQ in the memory.

Step 204. The NVMe controller processes the NVMe command.

Step 205. The NVMe controller writes an NVMe command response generated after completion of processing into a CQ in the memory.

Step 206. The NVMe controller sends an MSI-X interrupt to the host, instructing a CPU to read the CQ for processing.

In a PCIe bus, a PCIe device must support an MSI or MSI-X interrupt request mechanism. The interrupt request mechanism is to write an MSI or MSI-X interrupt request packet into a specific address of a system, and write data agreed by the system in order to notify the CPU that an interrupt is generated. A benefit brought by the feature is breaking a constraint of a conventional pin interrupt such that a quantity of interrupts is no longer limited either.

Step 207. The host reads the CQ in the memory, and fetches the NVMe command response for processing.

Step 208. After completion of processing, the host notifies the NVMe controller by writing an SQ queue pointer into the doorbell register of the NVMe controller.

As can be learned, the execution process includes eight steps and three phases in total a host phase, an NVMe device phase, and a host phase. The procedure is very long, and can be performed in series only. This finally causes a problem that a latency is relatively long. In addition, because there are two register operations and one interrupt operation, a lot of CPU resources are consumed.

Figure 3:
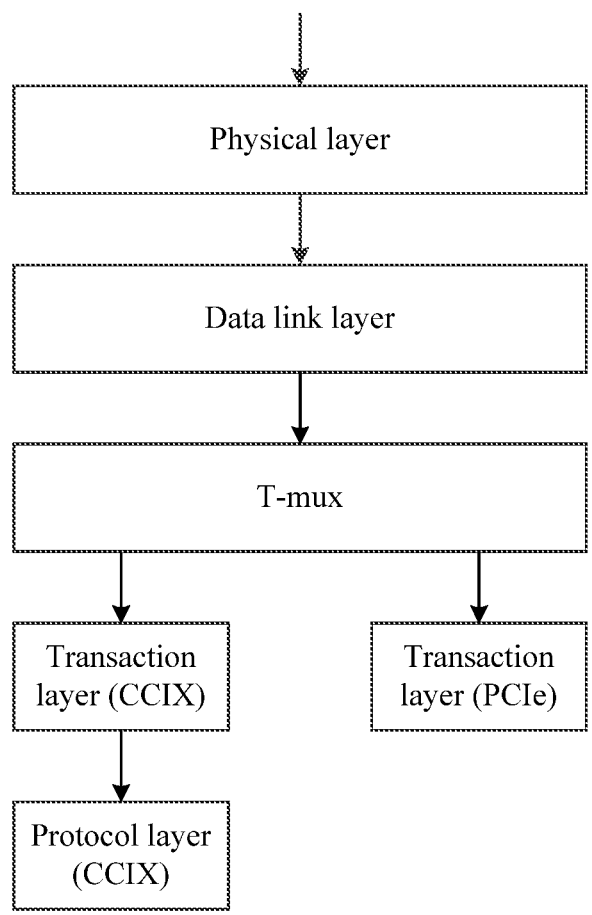
FIG. 3 is a schematic diagram of a CCIX protocol.

The following describes a feature of the CCIX protocol used in an NVMe command processing procedure in an embodiment of the present application. The protocol can be compatible with the PCIe standard, and protocol layers are customized to implement cache coherence and achieve a lower latency. The following describes a structure of the protocol. Referring to FIG. 3, FIG. 3 is a schematic diagram of the CCIX protocol. A physical layer of the CCIX protocol is the same as a physical layer of the PCIe standard, and data link layers thereof are also the same. A difference lies in that a transaction multiplex (T-mux) layer is disposed above the data link layer, where the T-mux layer separates a CCIX packet from a conventional PCIe packet, and directs the data link layer to a CCIX transaction layer. T-mux control is based on a programmable transmission channel (TC) value, and the value is initialized by a basic I/O system (BIOS) system to mark a TC corresponding to a CCIX virtual channel (VC). The transaction layer is an independent PCIe VC. A CCIX protocol packet is encapsulated into a PCIe message packet that travels in a published write channel. A packet format may be optimized by removing fields that are not required by the CCIX protocol. Then transaction layers above the T-mux layer are classified into two types according to CCIX and PCIe. For example, a transaction layer for PCIe processing is an independent PCIe VC. A coherence protocol packet is encapsulated into a PCIe message packet that travels in a published write channel. A packet format may be optimized by removing fields that are not required by the CCIX protocol.

For the VC, a plurality of VCs may be defined on an actual physical link channel, and are mainly used to improve transmission concurrency and bandwidth utilization. For the TC, because the T-mux is a many-to-one selector, when the T-mux selects a TC, determining needs to be performed according to a TC defined by a program in the BIOS, and a configuration mode of the T-mux is defined statically. To be specific, during initialization of the device, a specific value is defined according to a device type to control whether the T-mux selects the CCIX VC or the PCIe VC in the transaction layer. The value does not change dynamically in a work process.

It should be noted that, in the solution of this embodiment of the present application, when an NVMe device is connected to a system, the system determines a type of the NVMe device. When the NVMe device supports the CCIX protocol, a work mode of the CCIX protocol is configured for the NVMe device. For example, if the NVMe device can support the CCIX protocol, which means that the NVMe device supports both the CCIX and PCIe protocols, for the T-mux, when the NVMe device is initialized, the CCIX VC is selected during initialization, but for an NVMe device supporting only the PCIe protocol, the PCIe VC is selected during initialization.

Figure 4:
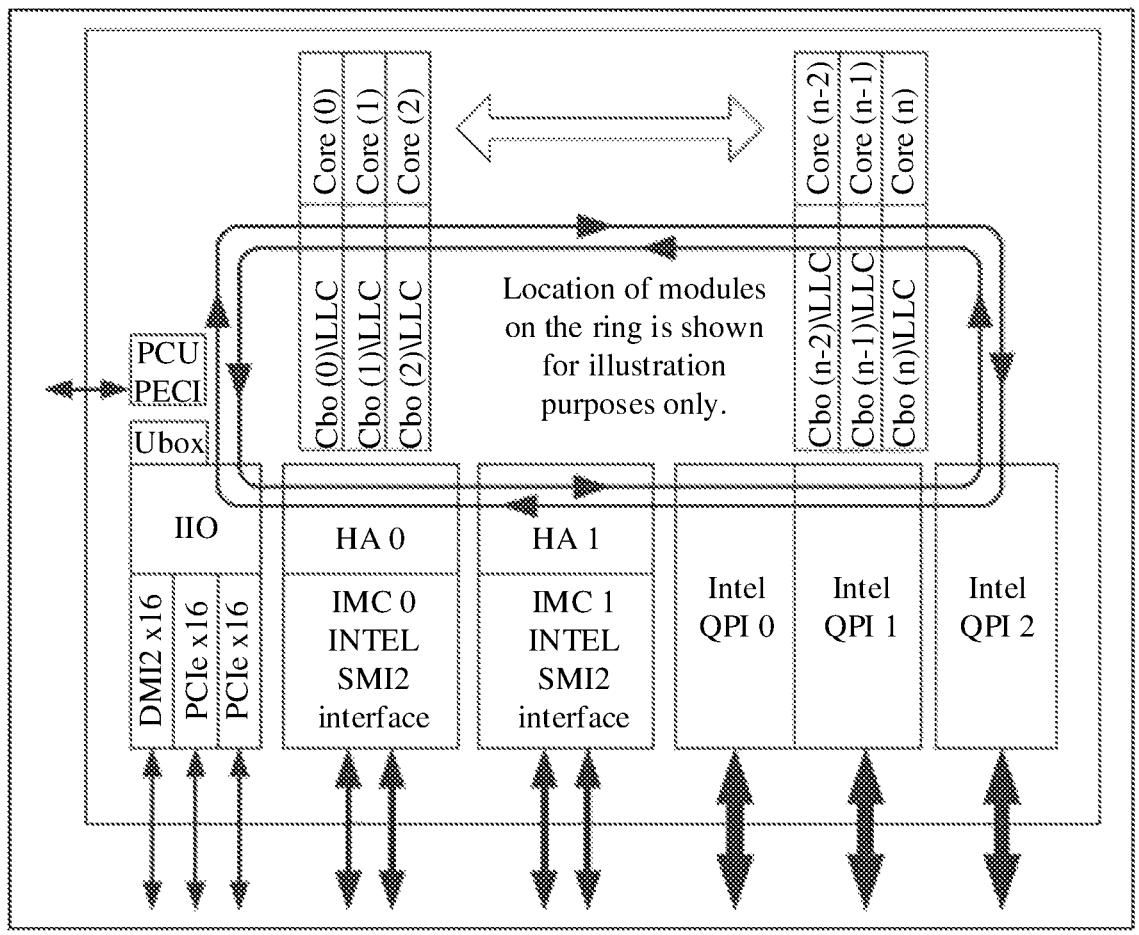
FIG. 4 is a schematic architectural diagram of an INTEL HASWELL processor.

The following describes a form of a processor in a host according to an embodiment of the present application. Referring to FIG. 4, FIG. 4 is a schematic architectural diagram of an INTEL HASWELL processor. The processor has a three-level cache structure, a 1 level-one (L1) high-speed cache, a level-two (L2) cache, and a level-three (L3) cache. The L1 cache includes a dedicated instruction cache and a dedicated data cache, which are 32 kilobytes (KB) respectively, 64 KB in total. The L2 cache is used as a middle level cache. The L3 cache is used as a level-three cache, and is also an end level cache in the processor structure. Each end level cache can reach up to 2.5 MB. The L1 cache and the L2 cache are exclusively used by each core of the processor, and the L3 cache is shared by all cores of the processor.

Figure 5:
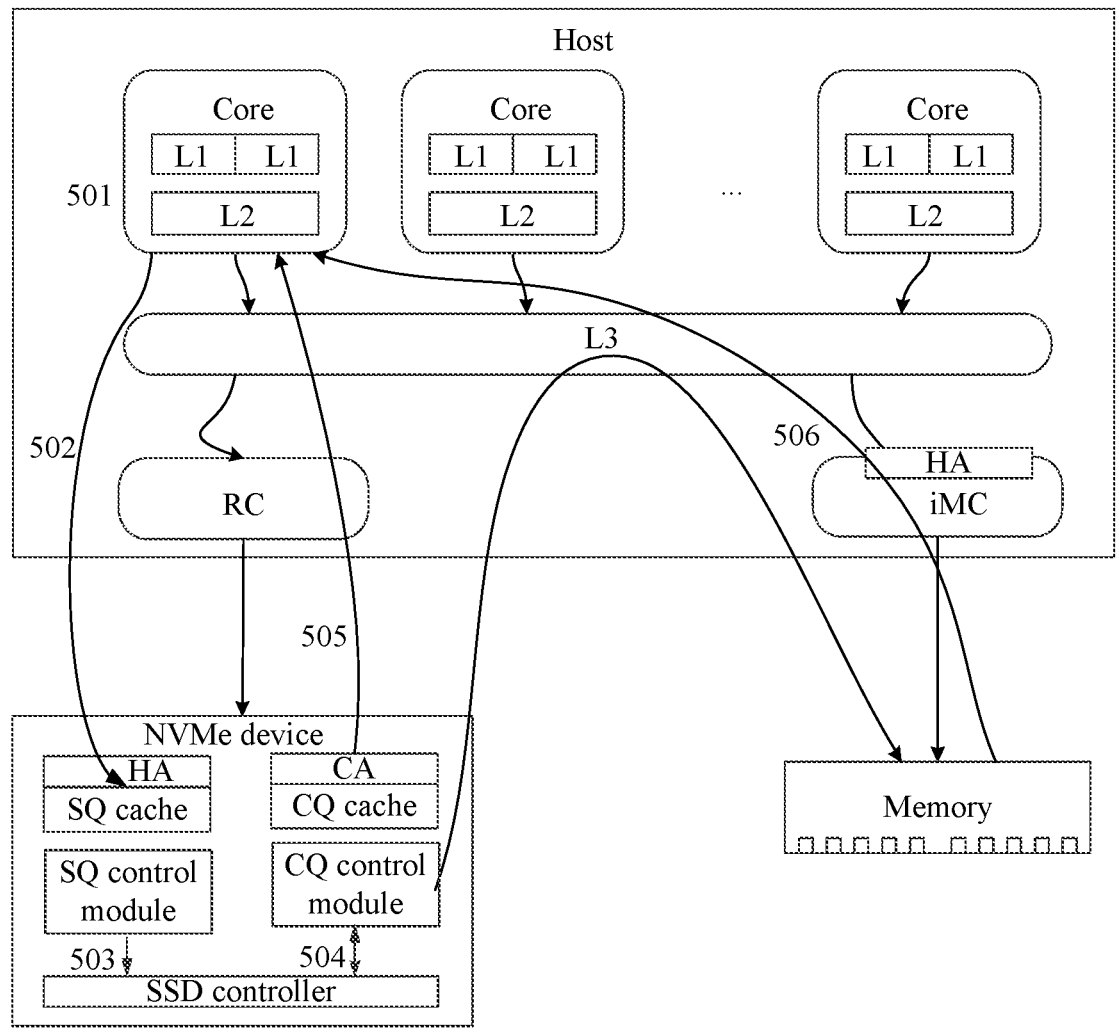
FIG. 5 is a schematic diagram of an NVMe data reading/writing method according to an embodiment of the present application.

The following describes an NVMe data reading/writing method according to an embodiment of the present application. Referring to FIG. 5, FIG. 5 is a diagram of an embodiment of an NVMe data reading/writing method according to an embodiment of the present application. A device performing the method includes an NVMe device. The NVMe device includes an SSD controller, a memory, a transceiver, an SQ cache configured to store an SQ, and a CQ cache configured to store a CQ, where an SQ control module configured to manage the SQ and a CQ control module configured to manage the CQ are disposed in the SSD controller. The method may include the following steps.

Step 501. A CPU generates an NVMe command using an NVMe driver.

A process of generating the NVMe command may include a block I/O (BLO) layer allocates a 4 KB cache space from a host cache, and writes a read/write request instruction into the 4 KB cache space, then the NVMe driver encapsulates the written read/write request instruction an SQE, and then the NVMe driver writes a 64-byte SQE into the SQ cache in the NVMe device, where the NVMe driver is a program executed by the CPU of the host.

Step 502. The transceiver receives the NVMe command written by a host into the SQ.

The transceiver exists as an interface for accessing the NVMe device, and the CPU writes the NVMe command into the SQ cache using the transceiver.

Step 503. When detecting that the SQ in the SQ cache changes, the SQ control module sends the NVMe command in the SQ to the SSD controller.

The SQ control module continuously detects changes of data in the SQ cache, and when detecting that the SQ changes, sends the NVMe command to the SSD controller for processing. A capacity of the SQ cache is a quantity of CPU cores of the host multiplied by an NVMe queue depth and then multiplied by 64 bytes. Because an SQE is 64 bytes, and each CPU core can separately run a thread, the capacity of the SQ cache is set to the foregoing quantity to ensure that no problem of waiting occurs when all cores work simultaneously.

A main function of the SQ control module is to manage writing and reading of the NVMe command in the SQ cache. To be specific, when the CPU of the host writes the NVMe command into the SQ cache or the SSD controller reads the NVMe command from the SQ cache, the SQ control module needs to be used. Therefore, implementability of the data reading/writing method is improved.

Certainly, in addition to managing writing and reading in the SQ cache, the SQ control module can further manage a collision between writing and reading of an NVMe command of a same address, and can preset a priority of writing the NVMe command to be higher than a priority of reading the NVMe command. Because writing is writing by the CPU outside the NVMe device, but reading is reading by the SSD controller in the NVMe device, a writing rate is lower than a reading rate. Therefore, the design can ensure smooth execution of a system.

In addition, the SQ control module may further maintain a position of the NVMe command in the SQ, and instruct the SSD controller to read the NVMe command in the SQ. To be specific, when a change occurs in the SQ, the SQ control module can instruct in time the SSD controller to process the NVMe command in the SQ. Therefore, implementability of the system is improved.

Step 504. The SSD controller executes the NVMe command, and writes a generated NVMe command response into the CQ using the CQ control module.

After generating the NVMe command response, the SSD controller writes the NVMe command response into the CQ using the CQ control module. The CQ control module is mainly configured to manage writing and reading of the NVMe command response in the CQ cache. To be specific, when the CPU of the host reads the NVMe command response from the CQ cache or the SSD controller writes the NVMe command into the CQ cache, the CQ control module needs to be used. This is similar to a manner of setting the SQ cache, a capacity of the CQ cache is a quantity of CPU cores of the host multiplied by an NVMe queue depth and then multiplied by 16 bytes. Because a CQE is 16 bytes, and each CPU core can separately run a thread, the capacity of the CQ cache is set to the foregoing quantity, to ensure that no problem of waiting occurs when all cores work simultaneously.

In addition, the CQ control module may further maintain a position of the NVMe command response in the CQ, and instruct the SSD controller to write the NVMe command response into the CQ. To be specific, after the NVMe command response is generated, which indicates that a read/write operation is already completed, the CQ control module can instruct in time the SSD controller to process the NVMe command response in the CQ. Therefore, implementability of the system is improved.

A specific process of executing the NVMe command by the SSD controller may be writing data stored in the NVMe device into the memory of the host. A detailed process may be first, the SSD controller reads 4 KB data in the NVMe device according to the NVMe command, and then a caching agent module writes the read data into the memory of the host by performing a remote storage operation, and completes the NVMe command.

Step 505. The SSD controller instructs, by triggering an interrupt, the host to read the CQ such that the host processes the NVMe command response in the CQ.

Step 506. The host reads the CQ in the CQ cache, and fetches the NVMe command response for processing.

As can be learned, after the foregoing NVMe device architecture is used, the SQ and the CQ are not stored in the memory of the host any longer, but are directly set in the NVMe device. In comparison with an existing NVMe command execution procedure, the NVMe device does not need to read the NVMe command from the memory of the host using DMA and write the NVMe command response into the memory of the host using DMA. Therefore, a latency is reduced greatly, a bandwidth collision in a memory operation is reduced, and memory usage of the CPU is reduced. In addition, because both the SQ and the CQ are located in the NVMe device, the CPU can directly read the NVMe command response in the CQ or directly write the NVMe command into the SQ, thereby further reducing consumption of CPU resources. In addition, the NVMe device designed in this manner can support CCIX in hardware, thereby implementing a unified software memory and heterogeneous computing of I/O operations.

A circuit chip is integrated in the SSD controller. The SQ control module and the CQ control module are both a part of integrated circuits integrated in the chip.

Optionally, a caching agent module is further disposed in the NVMe device, and the caching agent module is mainly applied to caching, and mainly configured to maintain coherence of a level-three cache of a CPU in the host with reference to the CCIX protocol.

Optionally, a home agent module is further disposed in the NVMe device, and the home agent module mainly manages a local cache space of the NVMe device, for example, reports a size of the local cache space of the NVMe device to the host such that the host can know usage of the local cache of the NVMe device. In addition, the home agent module mainly processes a read request and a write request in the local cache space.

In addition, the home agent module may be further connected to the SQ cache, and in this case, the home agent module may be further configured to receive a read request or a write request in the local cache, and return a response message to a sender of the read request or the write request, thereby processing and scheduling the read request and the write request in the local cache.

Figure 6:
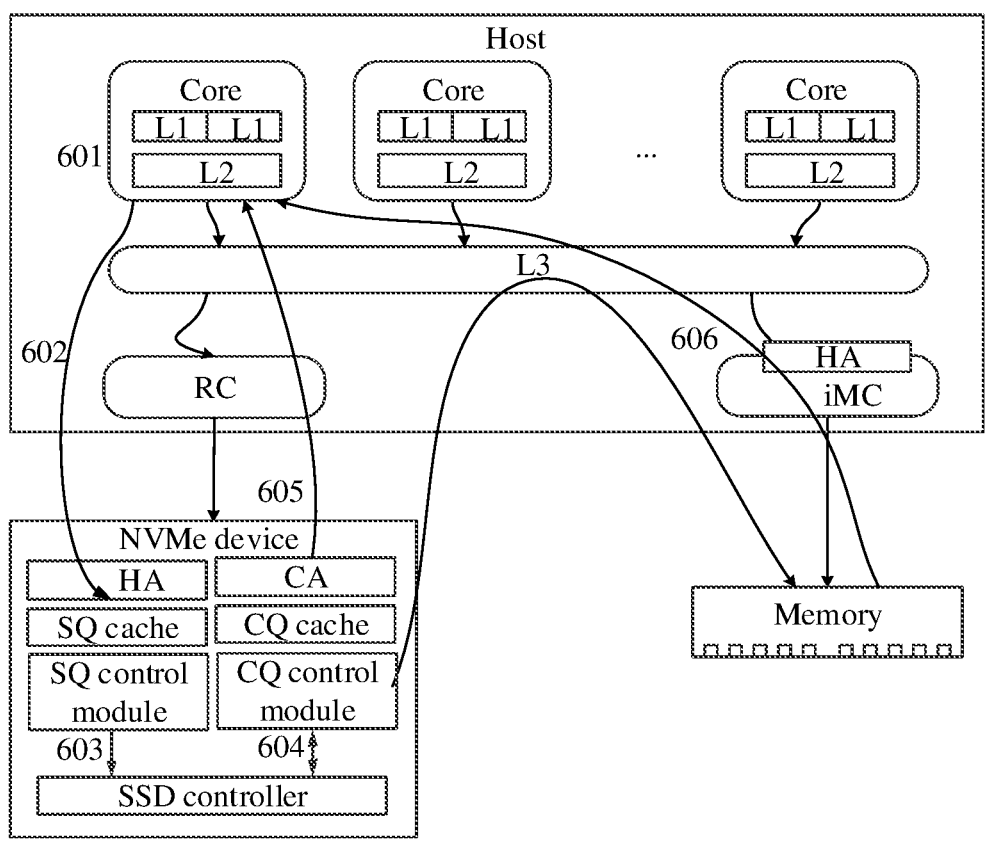
FIG. 6 is a diagram of an embodiment of an NVMe data reading/writing method according to an embodiment of the present application.

The foregoing describes an NVMe data reading/writing method according to an embodiment of the present application. The following describes another NVMe data reading/writing method. Referring to FIG. 6, FIG. 6 is a diagram of an embodiment of an NVMe data reading/writing method according to an embodiment of the present application. A device performing the method includes an NVMe device. The NVMe device includes an SSD controller and a memory, and may further include an NVMe cache configured to read or write data from or into a level-three cache of a CPU of a host, and a caching agent module configured to manage the NVMe cache. Functions of the caching agent module are similar to functions of the caching agent module in the embodiment shown in FIG. 5. In this case, an NVMe command execution procedure may be as follows.

Step 601. A CPU generates an NVMe command using an NVMe driver, and writes the NVMe command into an SQ of a memory of the host.

For a process of generating the NVMe command, refer to step 501 in the embodiment shown in FIG. 5. Details are not further described herein.

Step 602. The caching agent module listens to SQ data located in the host, and when the data in the SQ is updated, performs step 603.

Figure 7:
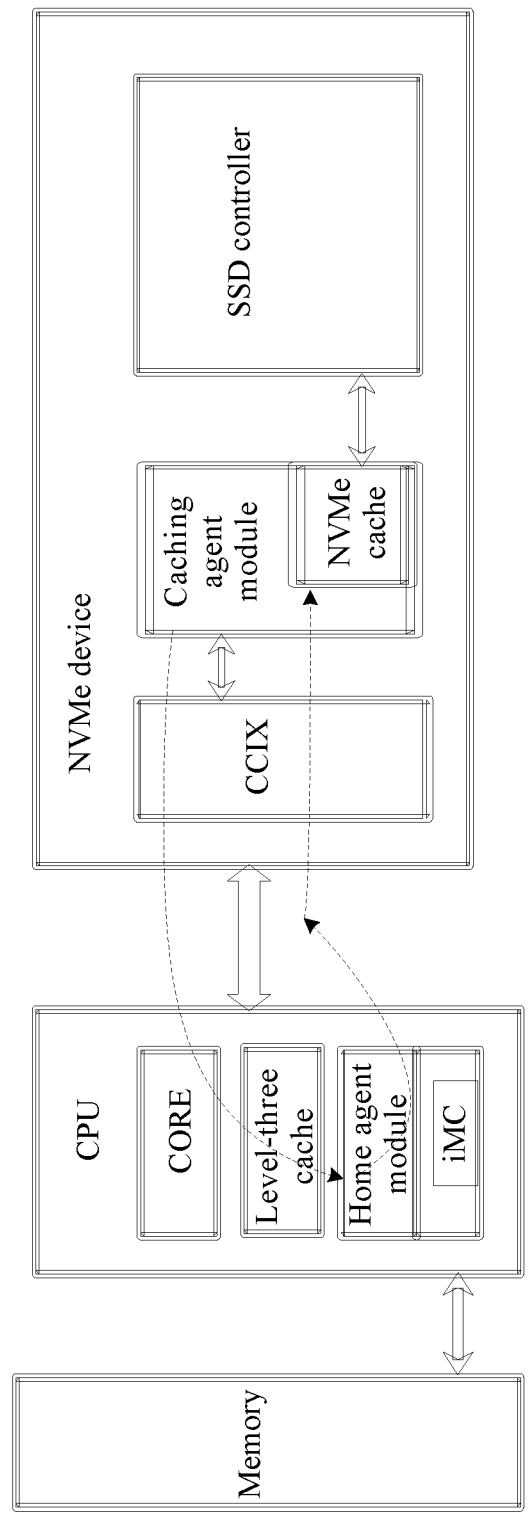
FIG. 7 is a schematic diagram of a listening process in an NVMe data reading/writing method according to an embodiment of the present application.

The caching agent module listens to the SQ data located in the host. For a specific listening process, refer to FIG. 7. FIG. 7 is a schematic diagram of the listening process in the NVMe data reading/writing method according to this embodiment of the present application. The SQ data is located in the memory of the host, or may be located in the level-three cache of the CPU of the host, and the SQ corresponding to the SQ data includes the NVMe command written by the host into the memory. The listening manner of the caching agent module may be as follows. The caching agent module sends a listen message to a home agent module in the CPU of the host, and then the home agent module queries and determines, according to the listen message, that the SQ data in an SQ address space changes, then the home agent module queries whether the SQ data is hit in the level-three cache, and if the SQ data is hit, directly fetches the hit SQ data from the level-three cache and returns the hit data to the NVMe cache, and the caching agent module may obtain the NVMe command from the NVMe cache.

Figure 8:
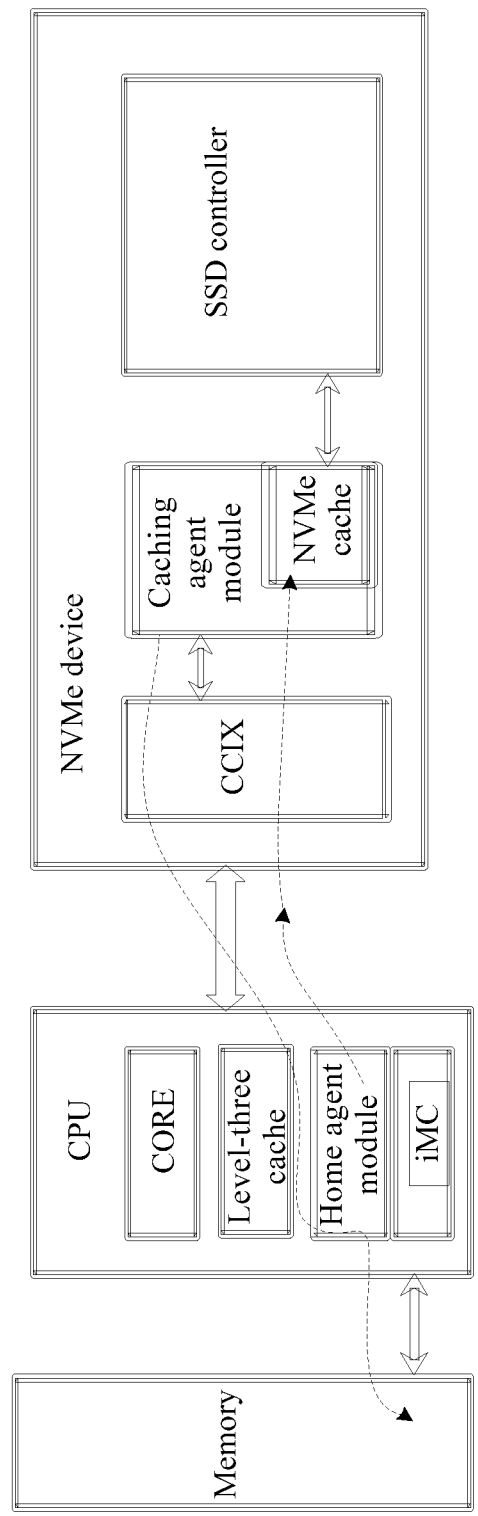
FIG. 8 is a schematic diagram of a listening process in an NVMe data reading/writing method according to an embodiment of the present application.

In addition, if the SQ data is not hit in the level-three cache, the procedure changes. For details, refer to FIG. 8, FIG. 8 is a schematic diagram of the listening process in the NVMe data reading/writing method according to this embodiment of the present application. If the SQ data is not hit in the level-three cache, the home agent module continues to query the memory of the host, and if data in the memory is updated, the home agent module directly reads the data from the memory and returns the data to the NVMe cache.

Step 603. The caching agent module reads the NVMe command from the SQ, and stores the NVMe command in the NVMe cache.

The read data is the NVMe command in the SQ. After completion of reading, the caching agent module stores the NVMe command in the NVMe cache.

Step 604. The SSD controller executes the NVMe command in the NVMe cache to generate an NVMe command response.

A specific process of executing the NVMe command by the SSD controller in step 604 is similar to that in step 504 in the embodiment shown in FIG. 5. Details are not further described herein.

Step 605. The caching agent module writes the NVMe command response into a CQ in the memory by performing a remote storage operation.

Figure 9:
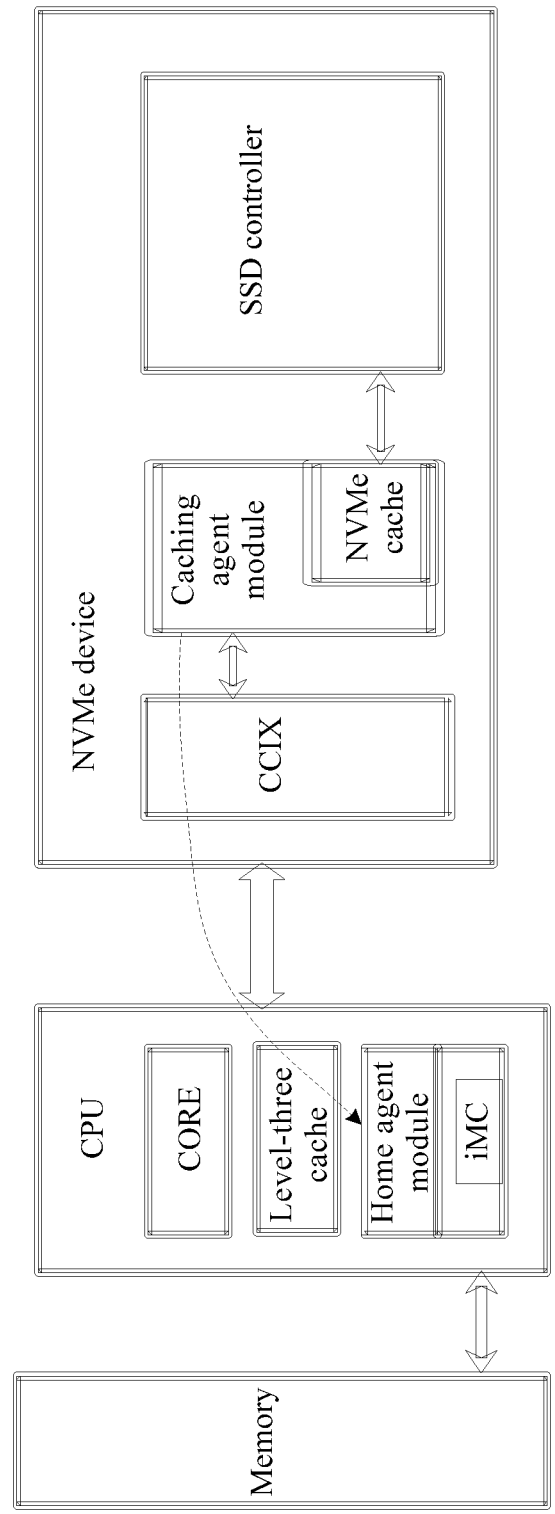
FIG. 9 is a schematic diagram of a process of writing an SQ queue pointer into a CQ using a CA in an NVMe data reading/writing method according to an embodiment of the present application.

A plurality of manners is available for the caching agent module to write the NVMe command response into the CQ in the memory by performing a remote storage operation. Referring to FIG. 9, FIG. 9 is a schematic diagram of the process of writing an SQ queue pointer into the CQ using the CA in the NVMe data reading/writing method according to this embodiment of the present application. First, the caching agent module initiates a memory write command to the home agent module of the CPU, and then the home agent module writes the NVMe command response into the CQ according to the memory write command.

Figure 10:
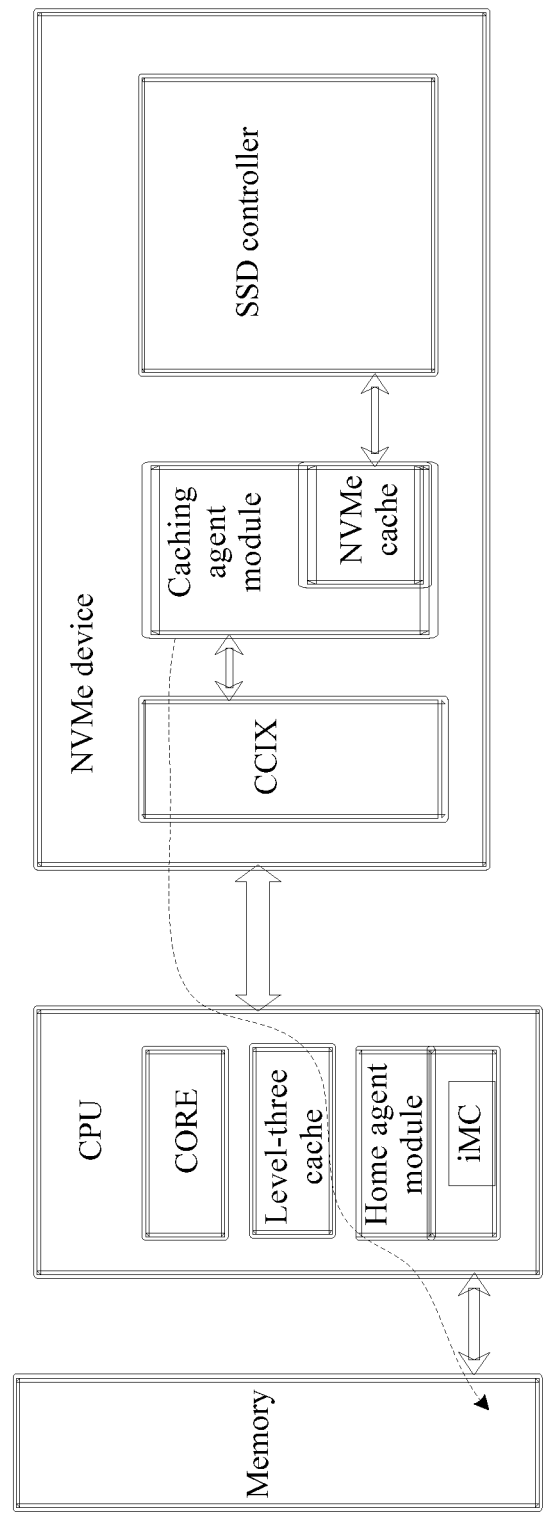
FIG. 10 is a schematic diagram of a process of writing into a CQ using a CA in an NVMe data reading/writing method according to an embodiment of the present application.

In another manner, referring to FIG. 10, FIG. 10 is a schematic diagram of the process of writing a CQ queue pointer into the CQ using the CA in the NVMe data reading/writing method according to this embodiment of the present application. In addition to directly writing the NVMe command response into the memory, the caching agent module may further first write the NVMe command response into the level-three cache of the CPU, and then instruct the CPU to write the NVMe command response into the memory. In this manner, the NVMe command response can also be finally written into the memory.

Step 606. The SSD controller instructs, by triggering an interrupt, the host to read the CQ such that the host processes the NVMe command response in the CQ.

Step 607. The host reads the CQ in the CQ cache, and fetches an NVMe command response for processing.

As can be learned, in comparison with an existing NVMe device that needs to be instructed by a host to passively execute an NVMe command, the NVMe cache and the caching agent module are added. Mainly the caching agent module listens to SQ data. Once the SQ data is updated, it means that an NVMe command is written into the SQ again. In this case, the caching agent module fetches the NVMe command to the NVMe device, then the SSD controller processes the NVMe command, and after completing the processing, stores an NVMe command response in the CQ in the memory using the caching agent module, and the SSD controller instructs, by triggering an interrupt, the host to read and process the NVMe command response in the CQ. It can be learned that, in this way, a manner of executing the NVMe command changes from passive to active. In addition, in comparison with an existing NVMe command execution procedure, a register notification manner of a doorbell mechanism is not required during switching of an execution phase, and therefore consumption of CPU resources can be reduced. In addition, the NVMe device designed in this manner can support CCIX in hardware, thereby implementing a unified software memory and heterogeneous computing of I/O operations.

Figure 11:
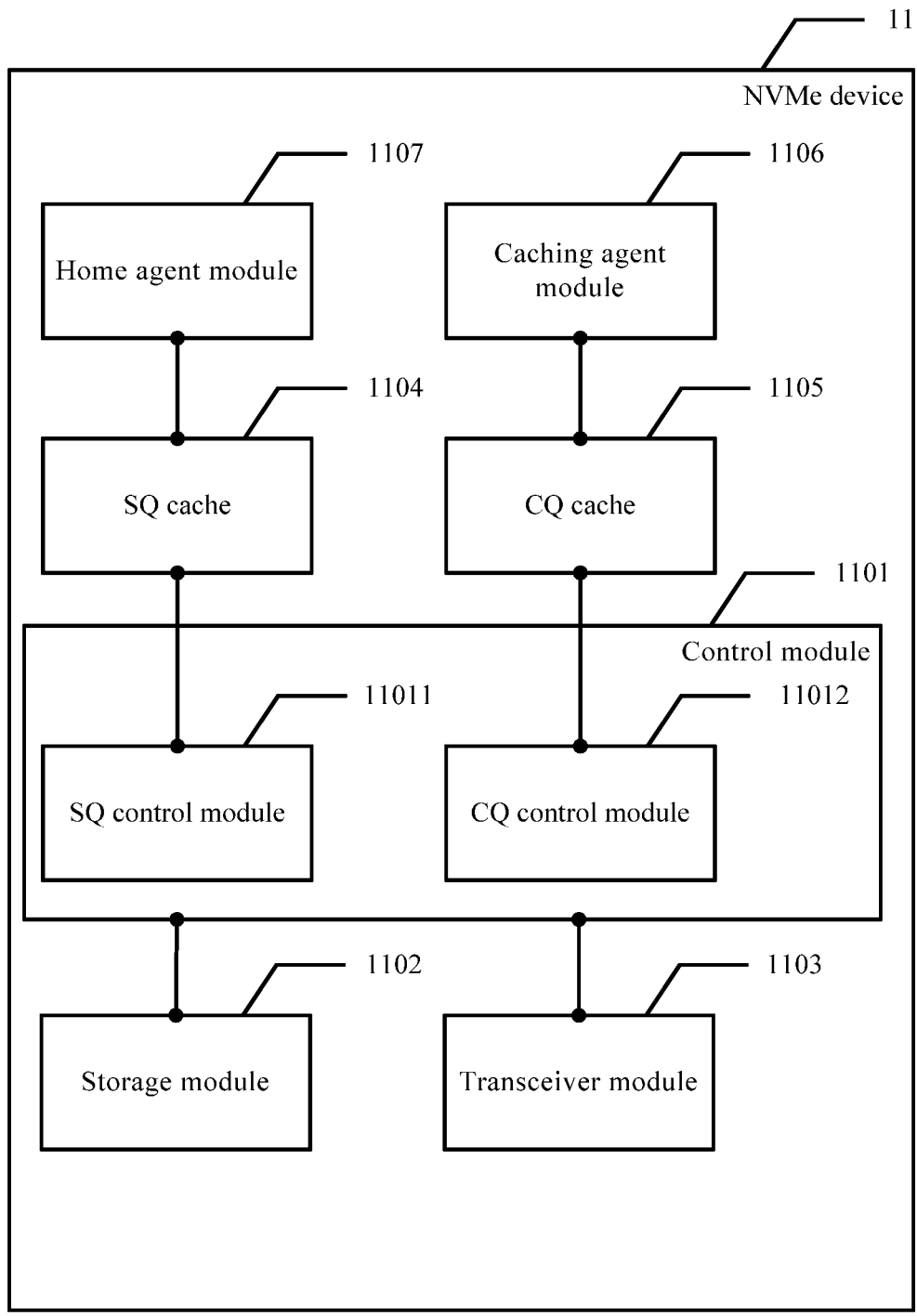
FIG. 11 is a structural diagram of an NVMe device according to an embodiment of the present application.

The foregoing describes an NVMe data reading/writing method according to an embodiment of the present application. The following describes an NVMe device according to an embodiment of the present application. The NVMe device is used as the NVMe device in the embodiment shown in FIG. 5. Referring to FIG. 11, FIG. 11 is a diagram of an embodiment of an NVMe device according to an embodiment of the present application. The NVMe device 11 includes a control module 1101, a storage module 1102, a transceiver module 1103, an SQ cache 1104 configured to store an SQ, and a CQ cache 1105 configured to store a CQ, where an SQ control module 11011 configured to manage the SQ and a CQ control module 11012 configured to manage the CQ are disposed in the control module 1101.

The transceiver module 1103 is configured to receive an NVMe command written by a host into the SQ.

The SQ control module 11011 is configured to send the NVMe command in the SQ to the control module 1101 when detecting that the SQ in the SQ cache 1104 changes.

The control module 1101 is further configured to execute the NVMe command, and write a generated NVMe command response into the CQ using the CQ control module 11012.

The control module 1101 is further configured to instruct, by triggering an interrupt, the host to read the CQ such that the host processes the NVMe command response in the CQ.

Optionally, the SQ control module 11011 is configured to manage writing and reading of the NVMe command in the SQ cache 1104.

Optionally, the SQ control module 11011 is further configured to manage a collision between writing and reading of an NVMe command of a same address, where a priority of writing the NVMe command is higher than a priority of reading the NVMe command.

Optionally, the SQ control module 11011 is further configured to maintain a position of the NVMe command in the SQ, and instruct the control module 1101 to read the NVMe command in the SQ.

Optionally, a capacity of the SQ cache 1104 is a quantity of CPU cores of the host multiplied by an NVMe queue depth and then multiplied by 64 bytes.

Optionally, the CQ control module 11012 is configured to manage writing and reading of the NVMe command response in the CQ cache 1105.

Optionally, the CQ control module 11012 is further configured to maintain a position of the NVMe command response in the CQ, and instruct the control module 1101 to write the NVMe command response into the CQ.

Optionally, a capacity of the CQ cache 1105 is a quantity of CPU cores of the host multiplied by an NVMe queue depth and then multiplied by 16 bytes.

Optionally, a caching agent module 1106 is disposed in the SSD controller, and is configured to maintain coherence of a level-three cache of a CPU in the host.

Optionally, the control module 1101 is further configured to read data in the NVMe device according to the NVMe command, and the caching agent module is further configured to write the data into a memory of the host by performing a remote storage operation.

Optionally, a home agent module 1107 is disposed in the SSD controller, and is configured to manage a local cache space of the NVMe device, further configured to report a size of the local cache space of the NVMe device to the host, and further configured to process and schedule a read request and a write request in the cache space.

Optionally, the home agent module is further connected to the SQ cache 1104, and the home agent module is further configured to receive a read request or a write request, and return a response message to a sender of the read request or the write request.

Figure 12:
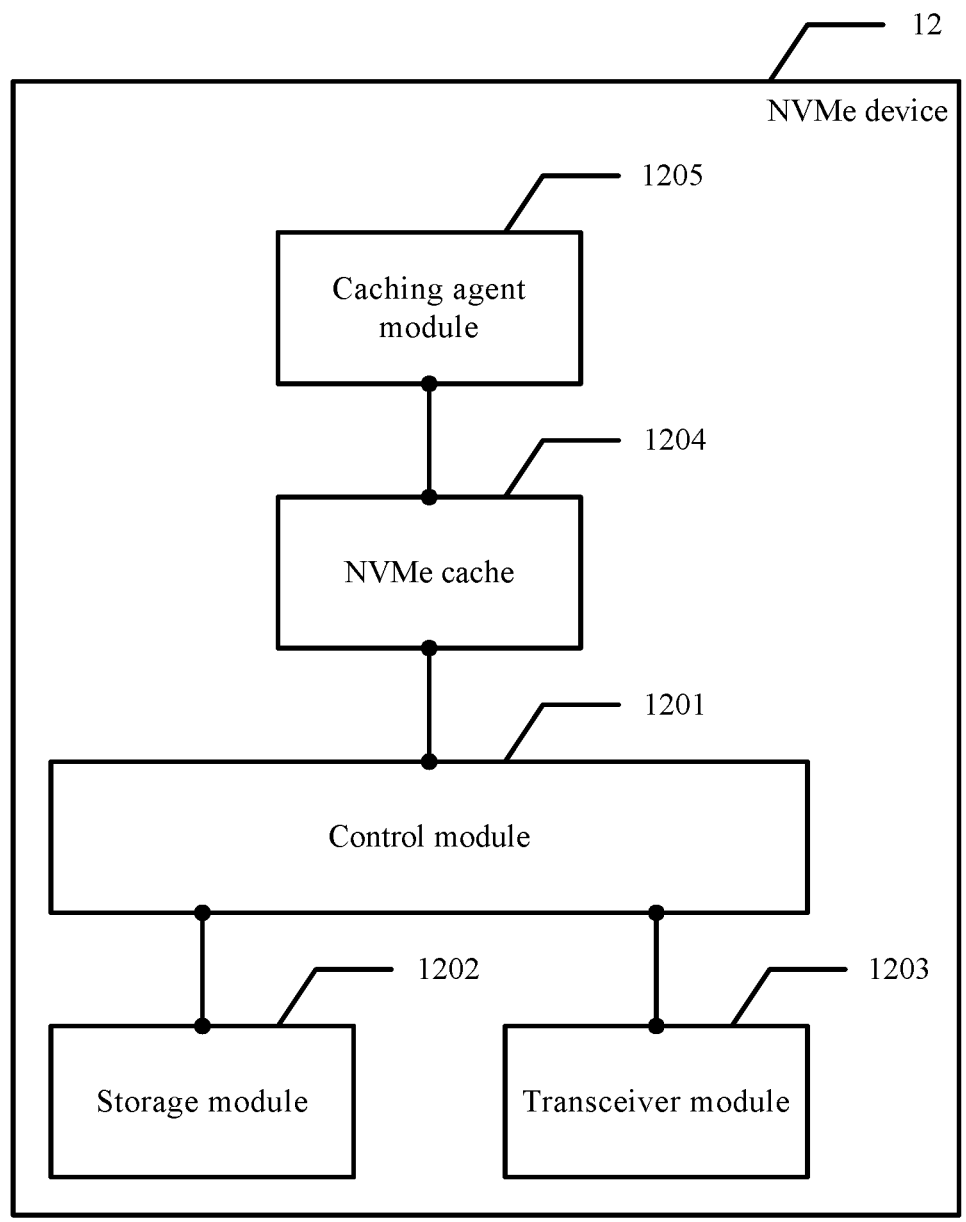
FIG. 12 is a diagram of an embodiment of an NVMe device according to an embodiment of the present application.

The foregoing describes an NVMe data reading/writing method according to an embodiment of the present application. The following describes an NVMe device according to an embodiment of the present application. The NVMe device is used as the NVMe device in the embodiment shown in FIG. 6. Referring to FIG. 12, FIG. 12 is a diagram of an embodiment of an NVMe device 12 according to an embodiment of the present application. The NVMe device 12 includes a control module 1201, a storage module 1202, a transceiver module 1203, an NVMe cache 1204 configured to read or write data from or into a level-three cache of a CPU of a host, and a caching agent module 1205 configured to manage the NVMe cache 1204.

The caching agent module 1205 is configured to listen to SQ data in the host, where an SQ corresponding to the SQ data includes an NVMe command written by the host into the memory.

When the data in the SQ is updated, the caching agent module 1205 is further configured to read the NVMe command from the SQ, and store the NVMe command in the NVMe cache 1204.

The control module 1201 is configured to execute the NVMe command in the NVMe cache 1204 to generate an NVMe command response.

The caching agent module 1205 is configured to write the NVMe command response into a CQ in the memory by performing a remote storage operation.

The control module 1201 is further configured to instruct, by triggering an interrupt, the host to read the CQ such that the host processes the NVMe command response in the CQ.

Optionally, the caching agent module 1205 is further configured to send a listen message to a home agent module 1206 in the CPU of the host, query and determine the SQ data in an SQ address space, and if the SQ data is hit in the level-three cache of the CPU, read the hit data in the level-three cache, and return the hit data to the NVMe cache 1204.

Optionally, the home agent module is further configured to query the memory of the host if the SQ data is not hit in the level-three cache of the CPU, and read the data from the memory, and return the data to the NVMe cache 1204 if data in the memory is updated.

Optionally, the caching agent module 1205 is further configured to initiate a memory write command to the home agent module of the CPU, and write the NVMe command response into the CQ according to the memory write command.

Optionally, the caching agent module 1205 is further configured to initiate the write command to the level-three cache of the CPU to write the NVMe command into the level-three cache, and notify that data in the level-three cache of the CPU is updated such that the CPU writes the NVMe command response into the CQ in the memory.

Figure 13:
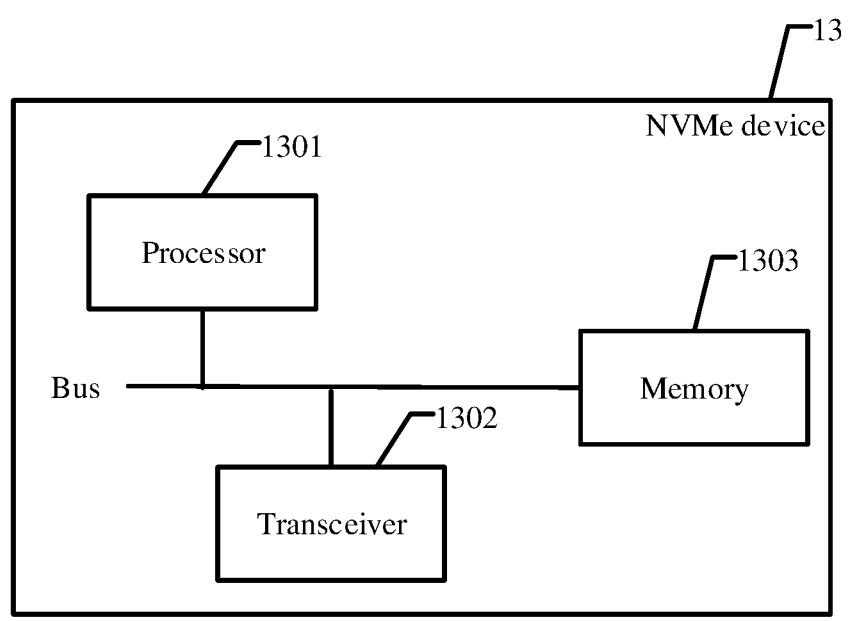
FIG. 13 is a diagram of an embodiment of an NVMe device according to an embodiment of the present application.

The following describes a structure of an NVMe device in an embodiment of the present application. Referring to FIG. 13, FIG. 13 is a diagram of an embodiment of an NVMe device 13 according to an embodiment of the present application. The NVMe device 13 may include at least one processor 1301, at least one transceiver 1302, and a memory 1303, all of which are connected to a bus. The NVMe device in this embodiment of the present application may have fewer or more components than that shown in FIG. 13, and two or more components may be combined, or component configurations or settings are different. Each component may be implemented in hardware including one or more signal processing and/or dedicated integrated circuits, or in software, or in a combination of hardware and software.

Further, for the embodiment shown in FIG. 11, the processor 1301 can implement functions of the control module 1101, the SQ control module 11011, the CQ control module 11012, the caching agent module 1106, and the home agent module 1107 in the embodiment shown in FIG. 11. The transceiver 1302 can implement functions of the transceiver module 1103 in the embodiment shown in FIG. 11. The memory 1303 has a plurality of structures, and is configured to implement functions of the storage module 1102, the SQ cache 1104, and the CQ cache 1105. The processor 1301 is configured to execute an instruction in the memory 1303 to implement the NVMe data reading/writing method.

Further, for the embodiment shown in FIG. 12, the processor 1301 can implement functions of the control module 1201 and the caching agent module 1205 in the embodiment shown in FIG. 12. The transceiver 1302 can implement functions of the transceiver module 1203 in the embodiment shown in FIG. 12. The memory 1303 has a plurality of structures, and is configured to implement functions of the storage module 1202 and the NVMe cache 1204. The processor 1301 is configured to execute an instruction in the memory 1303 to implement the NVMe data reading/writing method.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to other approaches, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. A Non-Volatile Memory Express (NVMe) data processing method, the method being performed by an NVMe device, the NVMe device comprising a solid state drive (SSD) controller, a transceiver, a submission queue (SQ) cache and a completion queue (CQ) cache, and the method comprising:
obtaining, by the transceiver, an NVMe command, the SSD controller comprising an SQ control circuit and a CQ control circuit, the SQ cache being configured to store an SQ, the CQ cache being configured to store a CQ, the SQ control circuit being configured to manage the SQ, and the CQ control circuit being configured to manage the CQ;
writing, by the transceiver, the NVMe command into the SQ;
sending, by the SQ control circuit, the NVMe command in the SQ to the SSD controller in response to the SQ control circuit detecting, without using a doorbell mechanism, a change of the SQ in the SQ cache;
executing, by the SSD controller, the NVMe command;
writing, by the SSD controller, a generated NVMe command response into the CQ; and
instructing, by the SSD controller, a host to read the NVMe command response in the CQ.

2. The NVMe data processing method of claim 1, further comprising managing, by the SQ control circuit, a collision between writing and reading of an NVMe command of a same address, and a priority of writing the NVMe command of the same address being higher than a priority of reading the NVMe command of the same address.

3. The NVMe data processing method of claim 1, further comprising:
maintaining, by the SQ control circuit, a position of the NVMe command in the SQ; and
instructing, by the SQ control circuit, the SSD controller to read the NVMe command in the SQ.

4. The NVMe data processing method of claim 1, wherein a capacity of the SQ cache is a quantity of central processing unit (CPU) cores of the host multiplied by an NVMe queue depth multiplied by 64 bytes.

5. The NVMe data processing method of claim 1, further comprising:
maintaining, by the CQ control circuit, a position of the NVMe command response in the CQ; and
instructing, by the CQ control circuit, the SSD controller to write the NVMe command response into the CQ cache.

6. The NVMe data processing method of claim 1, wherein the NVMe device further comprises a caching agent circuit, and the method further comprising maintaining, by the caching agent circuit, coherence of a level-three cache of a central processing unit (CPU) in the host.

7. The NVMe data processing method of claim 6, further comprising:
reading, by the SSD controller, data in the NVMe device based on the NVMe command; and
writing, by the caching agent circuit, the data into a memory of the host by performing a remote storage operation.

8. The NVMe data processing method of claim 1, wherein a capacity of the CQ cache is a quantity of central processing unit (CPU) cores of the host multiplied by an NVMe queue depth multiplied by 16 bytes.

9. The NVMe data processing method of claim 1, further comprising managing, by the SQ control circuit, writing and reading of the NVMe command in the SQ cache.

10. The NVMe data processing method of claim 1, further comprising managing, by the CQ control circuit, writing and reading of the NVMe command response in the CQ cache.

11. A Non-Volatile Memory Express (NVMe) device, comprising:
a submission queue (SQ) cache configured to store an SQ;
a completion queue (CQ) cache configured to store a CQ;
a solid state drive (SSD) controller coupled to the SQ cache and the CQ cache and comprising:
an SQ control circuit configured to manage the SQ; and
a CQ control circuit configured to manage the CQ; and a transceiver coupled to the SQ cache, the CQ cache, and the SSD controller and configured to:
  obtain an NVMe command; and
  write the NVMe command into the SQ;
the SQ control circuit being further configured to send the NVMe command in the SQ to the SSD controller in response to the SQ control circuit detecting, without using a doorbell mechanism, a change of the SQ in the SQ cache, and
the SSD controller being configured to:
  execute the NVMe command;
  write a generated NVMe command response into the CQ; and
  instruct a host to read the NVMe command response in the CQ.

12. The NVMe device of claim 11, wherein the SQ control circuit is further configured to manage a collision between writing and reading of an NVMe commend of a same address, and
a priority of writing the NVMe command of the same address being higher than a priority of reading the NVMe command of the same address.

13. The NVMe device of claim 11, wherein the SQ control circuit is further configured to:
  maintain a position of the NVMe command in the SQ; and
  instruct the SSD controller to read the NVMe command in the SQ.

14. The NVMe device of claim 11, wherein a capacity of the SQ cache is a quantity of central processing unit (CPU) cores of the host multiplied by an NVMe queue depth multiplied by 64 bytes.

15. The NVMe device of claim 11, wherein the CQ control circuit is further configured to:
  maintain a position of the NVMe command response in the CQ; and
  instruct the SSD controller to write the NVMe command response into the CQ cache.

16. The NVMe device of claim 11, further comprising a caching agent circuit coupled to the SSD controller and configured to maintain coherence of a level-three cache of a central processing unit (CPU) in the host.

17. The NVMe device of claim 16, wherein the SSD controller is further configured to: read data in the NVMe device based on the NVMe command; and
  write the data into a memory of the host by performing a remote storage operation.

18. The NVMe device of claim 11, wherein a capacity of the CQ cache is a quantity of central processing unit (CPU) cores of the host multiplied by an NVMe queue depth multiplied by 16 bytes.

19. The NVMe device of claim 11, wherein the SQ control circuit is further configured to manage writing and reading of the NVMe command in the SQ cache.

20. The NVMe device of claim 11, wherein the CQ control circuit is
  further configured to manage writing and reading of the NVMe command response in the CQ cache.

* * * * *